United States Patent [19]

Harper

[11] 3,915,271
[45] Oct. 28, 1975

[54] METHOD AND APPARATUS FOR ELECTRONICALLY CONTROLLING THE ENGAGEMENT OF COACTING PROPULSION SYSTEMS

[75] Inventor: Paul Douglas Harper, Timonium, Md.

[73] Assignee: Koppers Company, Inc., Pittsburgh, Pa.

[22] Filed: Sept. 25, 1974

[21] Appl. No.: 509,074

[52] U.S. Cl. ............... 192/.033; 192/.098; 74/847; 192/103 R; 192/67; 192/84 P
[51] Int. Cl.² ................. F16D 11/04; B60K 29/02
[58] Field of Search ......... 192/.032, .033, .02, .098; 74/847

[56] References Cited
UNITED STATES PATENTS

| | | | |
|---|---|---|---|
| 3,460,656 | 8/1969 | Swanson | 192/.098 |
| 3,756,358 | 9/1973 | Espenschied | 192/.09 |
| 3,834,499 | 9/1974 | Candellero et al. | 192/.033 |

*Primary Examiner*—Benjamin W. Wyche
*Attorney, Agent, or Firm*—Oscar B. Brumback; Boyce C. Dent

[57] ABSTRACT

An improved method and apparatus for controlling the engagement of coacting portions of primary and auxiliary power systems through the electronic detection of the speed and angular position relationships between the coacting portions and through the control of the speed of one of the power systems to achieve synchronous coupling. Sensors responsive to movement of the coacting portions of the systems generate first and second electrical signals each having electrical characteristics related to the speed and angular position of respective ones of the coacting portions of the two systems. The electrical signals are employed to sense the simultaneous occurrence of a desired speed and angular position relationship between the coacting portions of the system and the coacting portions are moved into engagement in response to the sensing of the desired relationship. A speed control signal is generated in response to the absence of the desired speed relationship between the coacting portions of the systems so as to vary the speed of one of the power sources in a direction tending to effect the desired speed relationship therebetween. The speed and angular position related electrical signals are preferably generated by pulse generators such as shaft encoders driven by the drive shafts of the power sources. The shaft encoders are arranged to provide pulses at a frequency related to shaft speed and at positions within the pulse stream indicative of the positions of coacting interlocking surfaces between driving portions of the two power sources. When, as indicated by the frequencies of the two pulse signals, a differential speed relationship within a predetermined speed difference range exists between two shafts, and when coincidence simultaneously exists between two pulses of the pulse signals, the coacting portions of the power sources are moved into engagement. Because of this coincidence requirement, engagement occurs with both proper speed and proper angular relationships between the coacting portions of the two power sources.

15 Claims, 13 Drawing Figures

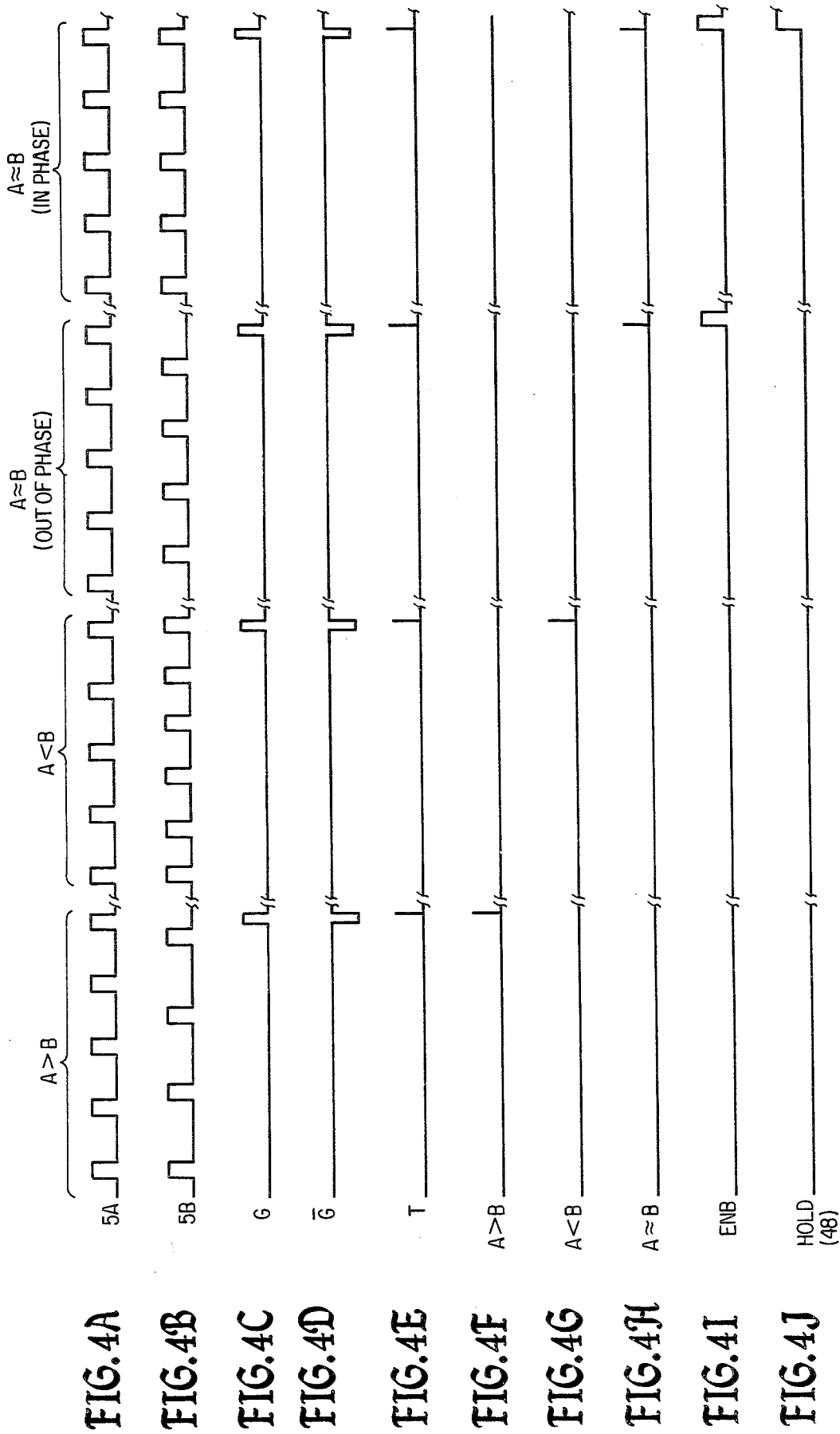

METHOD AND APPARATUS FOR ELECTRONICALLY CONTROLLING THE ENGAGEMENT OF COACTING PROPULSION SYSTEMS

BACKGROUND OF THE INVENTION

1. Field of the Invention

This invention relates generally to clutches and more particularly, to a method and system for controlling the engagement of coacting portions of a clutch interposed between two rotating shafts.

2. Description of the Prior Art

High capacity propulsion systems, particularly marine propulsion drives, frequently use dual power systems such as gas turbine engines. Usually one turbine is the primary power source and the other is an auxiliary power source for providing additional power in time of emergency or other need. Ordinarily, the primary system will be running on on-line and the auxiliary system will be at rest until needed. When needed, the auxiliary system is accelerated until it reaches synchronous speed with the primary system. At this time the systems are coupled to act in unison to furnish maximum power to the output of the primary system such as for driving a ship's propellor or other load. It also frequently happens that the auxiliary turbine will be running on stand-by in anticipation of need. In this instance, being unloaded, the auxiliary turbine may be running faster than the primary turbine if its speed is not controlled. It should be understood, however, that such dual power systems may be used in many applications, for example, in power generating stations.

Since the power to be transmitted is usually immense, the systems are usually coupled together with positive engagement devices such as dog clutches and gear type couplings. These devices customarily include interlocking surfaces such as lugs or gear teeth. Thus, it can be readily appreciated that engagement of the interlocking surfaces must occur very close to synchronous speed and alignment of the lugs or teeth to avoid damage.

One problem associated with this arrangement is the sensing of exactly synchronous speed and alignment of the surfaces to be interlocked and the concurrent engagement thereof. One known arrangement causes axial shifting of a coupling half into engagement with a mating half when the speed of the coupling half driven by the auxiliary turbine or engine overtakes the coupling half secured to the primary engine. An example of this arrangement is found in Clements U.S. Pat. No. 3,106,276 wherein a ratchet and pawl assembly overruns until the accelerating coupling half overtakes the running half. At this point, the pawl engages the ratchet teeth which then cause one of the coupling halves to shift axially by means of a helical spline. This arrangement is not particularly suited for the transmission of high torque at high speed because at least part of the torque is initially transmitted through the relatively weak ratchet and pawl assembly. In addition, it is not suited for engaging interlocking surfaces when the auxiliary system is decelerating towards synchronous speed with the primary system.

Another similar arrangement is shown in Sigg U.S. Pat. No. 3,154,181 wherein torque tending to be transmitted through a ratchet and pawl assembly following engagement of the coupling halves is relieved by a hydraulic system within the coupling. This arrangement is quite complex and expensive and is also not suited for engaging coupling members when the speed of the auxiliary system may be approaching synchronous speed from either direction.

Still another arrangement is shown in Shenk U.S. Pat. No. 3,640,573 which uses friction discs to force synchronization of the shafts to be coupled prior to coupling engagement of the torque transmitting elements. This arrangement requires some portion of the torque to be initially transmitted through the friction discs to achieve synchronization and therefore soon results in worn friction elements.

Yet another arrangement disclosed and claimed in U.S. Pat. application Ser. No. 356,238 and now U.S. Pat. No. 3,830,349 by Charles H. Williams and assigned to the assignee of the present invention provides a simple means for achieving positive connection between the coacting portions of primary and auxiliary propulsion systems when synchronous speed occurs regardless of whether the auxiliary system is accelerating or decelerating toward synchronous speed with the primary system. In accordance with the Williams patent application, the primary on-line system is rotated at substantially constant speed and the auxiliary on-coming system is accelerated or decelerated as required toward the speed of the primary system. The impending occurrence of synchronous speed of two systems and the alignment of interlocking surfaces to be engaged are both sensed and coacting interlocking surfaces between driving portions of the systems are automatically engaged in response to the occurrence of synchronous speed and alignment.

In accordance with the Williams patent application, impending synchronization is preferably sensed by means of a planetary differential having a planetary output whose direction of rotation reflects acceleration or deceleration of the on-coming system and whose speed is directly proportional to the difference in speeds of the two inputs; one input being derived from the on-line engine and the other derived from the on-coming engine. As the input speeds approach synchronization, the speed of the planetary output decelerates to nearly zero; at this time a sensor is used to detect the speed and direction of rotation of the planetary output. At a predetermined point approaching zero speed, the sensor energizes a shifting circuit which in turn energizes a shifting device to engage the coupling halves when interlocking surfaces on the halves are in alignment.

It can be seen from the above that the system disclosed in the Willimas patent application alleviates some or all of the deficiencies of the prior art systems. However, the Williams system is primarily mechanical in nature with speed differentials being sensed mechanically by a gear arrangement driven by the respective propulsion systems.

OBJECTS AND SUMMARY OF THE INVENTION

It is accordingly an object of the present invention to provide an improved method and apparatus for controlling the engagement of coacting portions of primary and auxiliary power systems by a relatively simple and inexpensive electronic circuit through highly accurate electronic detection of the speed and angular position relationships between the coacting portions and through electronic control of the speed of one of the power systems to achieve synchronous coupling.

Another object of the present invention is to provide an improved method and apparatus for connecting driving members of two rotating power sources for simultaneous operation through the generation of digital electrical signals indicative of the speed and angular position relationships between coacting portions of the power sources and through the engagement of the coacting portions in response to the simultaneous occurrence of desired speed and angular position relationships between the coacting portions as indicated by the electrical signals.

These and other objects of the present invention are preferably accomplished by generating first and second electrical signals each having electrical characteristics related to the speed and angular position of respective ones of the coacting portions of the two systems. The electrical signals are employed to sense the simultaneous occurrence of a desired speed and angular position relationship between the coacting portions of the system and the coacting portions are moved into engagement in response to the sensing of the desired relationship. A speed control signal is generated in response to the absence of the desired speed relationship between the coacting portions of the systems so as to vary the speed of one of the power sources in a direction tending to effect the desired speed relationship therebetween.

In accordance with the preferred embodiment of the invention, the speed and angular position related electrical signals are generated by pulse generators such as shaft encoders driven by the selectively connectable drive shafts of the power sources. The shaft encoders are arranged to provide pulses at a frequency related to shaft speed and at positions within the pulse stream indicative of the positions of coacting interlocking surfaces between driving portions of the two power sources. When, as indicated by the frequencies of the two pulse signals, a differential speed relationship within a predetermined speed difference range exists between the two shafts, and when coincidence simultaneously exists between two pulses of the pulse signals, the coacting portions of the power sources are moved into engagement. Because of this coincidence requirement, engagement occurs with both proper speed and proper angular relationships between the coacting portions of the two power sources.

If the differential speed relationship between the coating portions of the systems is outside the desired, predetermined speed difference range permitted for enabling engagement, the speed of one of the power sources, preferably the auxiliary propulsion system, is varied in a direction tending to reduce the speed difference between the coacting portions and thereby tending to bring the differential speed relationship within the desired, predetermined speed difference range.

These and other objects and advantages of the present invention will be more fully appreciated by one skilled in the art to which the invention pertains from the following detailed description when read in conjunction with the accompanying drawings. It is to be expressly understood, however, that the drawings are not intended to be restrictive but for the purpose of illustration only.

DETAILED DESCRIPTION

Figure 1:
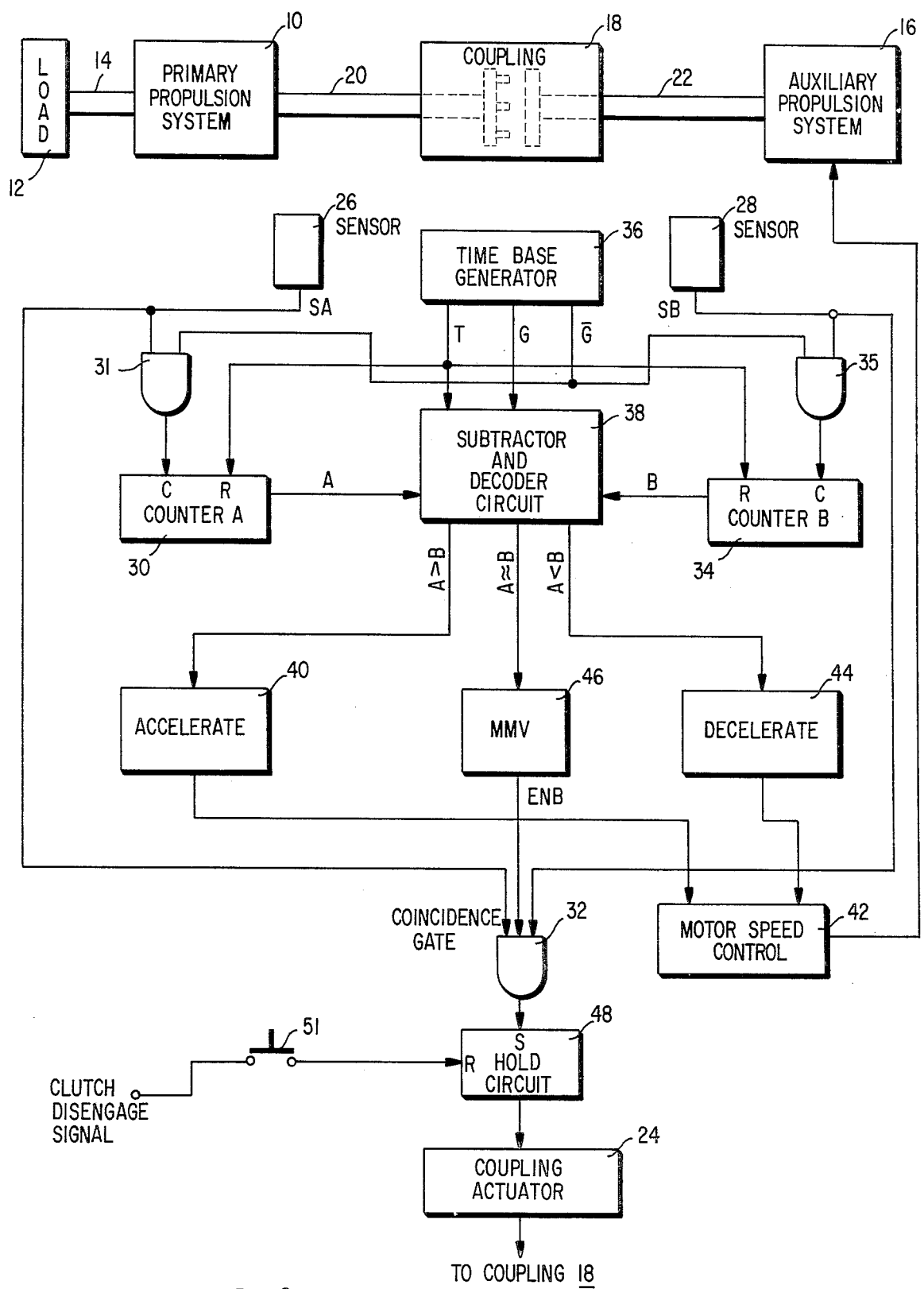
FIG. 1 is a functional block diagram illustarting one embodiment of the present invention.

A preferred embodiment of the present invention is illustrated in the functional block diagram of FIG. 1. Referring now to FIG. 1, a primary propulsion system or power source 10 such as a gas turbine may be connected to a load 12 in a suitable manner such as by way of an output drive shaft 14. An auxiliary propulsion system or power source 16 may be disposed for connection to the primary propulsion system 10 through a selectively engageable coupling means 18, More specifically, a connecting shaft 20, e.g., an extension of the drive shaft 14 or other suitable means for transmitting power to the load 12, may connect the primary propulsion system 10 to one or two selectively engageable portions of the coupling means 18. A drive member or drive shaft 22 of the auxiliary propulsion system 16 may be connected to the other selectively engageable portion of the coupling means 18 so as to provide for the selective connection of the auxiliary propulsion system 16 to the load when needed for additional power.

For the purposes of description, the coupling means 18 may be any conventional gear type coupling or clutch type coupling with interlocking lugs and may include a shifter or other suitable mechanism for shifting one half of the coupling towards the other to effect engagement of the halves when actuated by a suitable coupling actuator 24. One such coupling and electrically operable coupling actuator is described in greater detail in the previously referenced Williams patent application, the disclosure of which is hereby incorporated by reference.

With continued reference to FIG. 1, the coacting, engageable portions of the coupling means 18 preferably include teeth or lugs to ensure positive transfer of torque from the auxiliary propulsion system 16 to the load 12. Accordingly, the interlocking or coacting halves of the coupling means 18 must rotate at synchronous speed and must be in angular alignment before coupling is effective.

In accordance with the present invention, sensors 26 and 28 are provided at appropriate locations, e.g., adjacent the drive shafts 20 and 22, to sense the rotation of the coacting portions of the coupling 18 and to provide respective electrical signals SA and SB having electrical characteristics related to the speed and angular position of the respective coacting portions. The signals SA and SB are preferably digital signals (e.g., a series of pulses) having a pulse repetition rate or frequency related to the speed of rotation of the respective shafts 20 and 22 to which the coacting coupling portions are connected. In addition, the positions of the pulses in the SA and SB signals are related to the positions of the interlocking lugs or teeth on the coacting portions of the coupling 18 as will hereinafter be described in greater detail.

The SA signal from the sensor 26 is supplied to the trigger or clock input terminal C of a suitable conventional digital counter 30 by way of a suitable gating circuit 31 such as the illustrated AND gates. The SA signal is also supplied to one input terminal of a suitable three input terminal coincidence gate 32 such as the illustrated AND gate. The SB signal from the sensor 28 is supplied to the trigger or clock input terminal C of a suitable conventional digital counter 34 by way of a suitable gating circuit 35 and to a second input terminal of the AND gate 32.

A suitable conventional time base generator 36 supplies a periodic time signal T to the subtractor and decoder circuit 38 and to the reset input terminal R of each of the counters 30 and 34. The time base generator 36 also supplies a periodic gating signal G to a suitable conventional difference circuit 38 and may supply the inverse of the gating signal G (i.e., the signal $\overline{G}$) to one input terminal of each of the AND gate 31 and 35.

The time base generator 36 may be any suitable conventional timing circuit capable of providing regularly spaced sampling or gating pulses G and the inverse $\overline{G}$ thereof, and a timing pulse T occurring some time prior to the end of each of the pulses G and of lesser duration than the pulses G. A suitable oscillator and frequency dividing circuit may be utilized for this purpose. Since the period between successive pulses of the signal G determines the sample time of the counters 30 and 34, the oscillator may be variable in frequency to accommodate the sample time as desired.

The counters 30 and 34 may be conventional digital counting circuits such as conventional ripple counters. The counter output signals may be supplied to the subtractor and decoder circuit 38 in parallel in order to provide relatively fast processing of the counter output signals.

The output signals A and B from the counters 30 and 34, respectively, may be supplied to the data input terminals of the subtractor and decoder circuit 38. The output signal A>B may be supplied through a suitable accelerate circuit 40 to the accelerate input terminal of a suitable conventional motor speed control circuit 42 and the output signal A<B from the subtractor and decoder circuit 38 may be supplied through a suitable decelerate circuit 44 to the decelerate input terminal of the motor speed control 42. The output signal A≈B may be supplied to the trigger input terminal of a conventional monostable multivibrator 46 and the output signal from the true output terminal Q of the multivibrator 46 may be supplied to the third input terminal of the AND gate 32.

The output signal from the AND gate 32 may be applied to the set input terminal of a suitable hold circuit 48 such as a bistable multivibrator or flip-flop and a clutch disengage signal may be selectively supplied to the reset input terminal R of the hold circuit 48 by way of a pushbutton or other suitable switch 51. The output signal from the motor speed control 42 may be supplied to the auxiliary propulsion system 16 to control the speed thereof as will hereinafter be described.

In operation, the illustrated coupling control circuit may be energized when it is desired to provide additional power to the load 12 from the auxiliary propulsion system 16. The auxiliary propulsion system 16 may be at some running speed when the control circuit is energized or may be brought up to synchronous speed from rest as described hereinafter.

Assuming that both the primary propulsion system 10 and the auxiliary propulsion system 16 are running, the sensors 26 and 28 generate output signals having electrical characteristics indicative of the speed and angular positions of the coacting portions of the coupling 18 associated with the respective primary and auxiliary propulsion systems 10 and 16. As is shown in FIGS. 4A and 4B, for example, the sensors may provide output signals SA and SB having pulse repetition frequencies related to the speeds of the respective propulsion systems 10 and 16.

The negative going or trailing edge of the timing pulse T (FIG. 4E) from the time base generator 36 may be employed in any suitable conventional manner to periodically reset the counters 30 and 34 to establish the same zero time reference for each of the counters. Starting at the zero time reference, the counters 30 and 34 count the pulses in the respective SA and SB signals for a time period determined by the timing signals from the time base generator 36. At the end of the predetermined time period, the $\overline{G}$ signal (FIG. 4D) inhibits the AND gates 31 and 35 preventing the respective counters 30 and 34 from being further incremented by the SA and SB signals. The G signal (FIG. 4C) from the time base generator 36 enables the subtractor and decoder circuit 38 and the A and B counter output signals are subtracted. Since the counters 30 and 34 count the pulses of the SA and SB signals over the same period of time and these signals have frequencies related to the speed of the respective coacting portions of the coupling 18, the difference signal (e.g., A-B) represents the difference in speed between the coacting portions of the coupling 18.

A decoding circuit in the subtractor and decoder circuit 38 decodes the results of the subtraction and, in response to the timing signal T (FIG. 4E), provides one of the three output signals A>B, A<B and A≈B (FIGS. 4F, 4G and 4H). Assuming, for example, that the speed of the coupling portion associated with the primary propulsion system 10 is greater than the speed of the coupling portion associated with the auxiliary propulsion system 16, the A>B signal is gated out of the subtractor and decoder circuit 38 to the accelerate circuit 40 and the motor speed control 42 increases the speed of the auxiliary propulsion system 16 by some predetermined incremental amount. Similarly, assuming that the speed of the coupling portion associated with the auxiliary propulsion system 16 is greater than that of the coupling portion associated with the primary propulsion system 10, the subtractor and decoder circuit 38 provides the A<B signal to the decelerate circuit 44 and the motor speed control 42 decreases the speed of the auxiliary propulsion system 16 by the predetermined incremental amount.

The counters 30 and 34 are reset after their output signals are compared, and the above procedure repeats to provide another indication of the speed relationship between the coacting portions of the coupling 18. The speed of the auxiliary propulsion system 16 continues to be increased or decreased incrementally in response to the determined speed relationship between the coacting portions of the coupling 18 until a desired speed relationship exists. In accordance with the preferred embodiment of the invention, this desired speed relationship exists when the differential speed relationship is within a predetermined speed difference range. An acceptable speed difference range may be determined by the design of the sensors 26 and 28 and/or the decoding circuitry of the subtractor and decoder circuit 38 as will subsequently be described.

The detection of an acceptable speed difference range results in the generation of the A≈B signal which in turn triggers the multivibrator 46 to generate the enable signal ENB (FIG. 4I). The ENB signal from the multivibrator 46 enables the AND gate 32 for some predetermined period of time which may be set as desired in order to provide a desired time period in which to detect angular alignment. Since the positions of the pulses in the SA and SB signals are indicative of the angular positions of the respective coacting portions of the coupling 18, the coincidence of two pulses in the respective SA and SB signals indicates the proper angular alignment of the two coacting portions.

Thus, if coincidence between a pulse of the SA signal and a pulse of the SB signal occurs simultaneously with the enabling of the gate 32 (i.e., when the speed differential between the coacting portions of the coupling 18 is within the desired speed difference range), the hold circuit 48 is set by an output signal from the coincidence AND gate 32 and the coupling actuator 24 is energized thereby causing the engagement of the coacting portions of the coupling 18 (FIG. 4J). Coupling actuator 24 remains energized until a reset signal is supplied to the R input of hold circuit 48 by reset pushbutton 51.

In summary, it can be seen from the above that the sensors 26 and 28 generate pulse signals indicative of the speed and angular position relationships of the coacting portions of the coupling 18. The differential speed relationship is determined from the sensor output signals by the counters 30 and 34 and the subtractor and decoder circuit 38. When a desired differential speed relationship within a predetermined speed difference range exists, the gate 32 is enabled and, in response to coincidence between a pulse in each of the sensor output signals, the enabled gate 32 effects the movement of the coacting portions of the coupling 18 into engaging relationship. If the differential speed relationship is not within the predetermined desired speed difference range, the speed of the auxiliary propulsion system 16 is varied in a direction tending to reduce the speed difference between the coacting portions of the coupling 18 so that the desired speed difference relationship eventually exists. Accordingly, the auxiliary propulsion system 16 is connected to the primary propulsion system 10 at a time when both the speed and angular position relationship of the coacting portions of the coupling 18 are proper.

Figure 2:
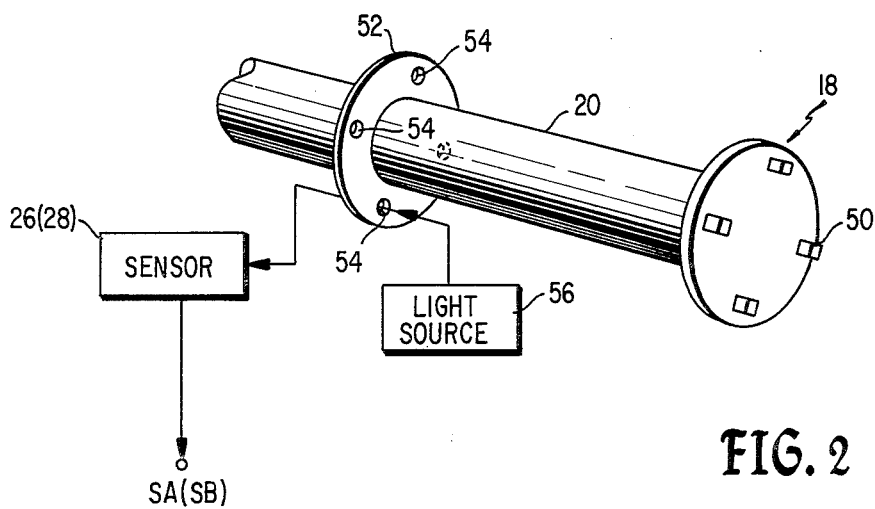
FIG. 2 is a pictorial representation of one of the shafts and coupling portions of the system of FIG. 1 schematically illustrating the position and speed signal generator.

To further facilitate an understanding of the invention, one embodiment of the sensors 26 and 28 is shown in FIG. 2 wherein like numerical designations are utilized to designate elements previously described. Referring now to FIG. 2, one coacting portion of the coupling 18 may be provided with interlocking lugs 50 at spaced positions thereon or may be provided with other suitable interlocking members such as teeth to positively engage the other coacting portion of the coupling 18. For example, four lugs may be provided at 90° intervals around the surface of the coacting portion of the coupling.

The shaft 20 connected to the primary propulsion system and the associated coacting portion of the coupling 18 may be provided with a plate 52 extending radially outwardly along its periphery. One of the sensors 26 and 28 may be positioned adjacent the plate 52 in cooperative relationship with the plate 52 so as to generate pulses at angular intervals corresponding to the angular intervals of the lugs 50. For example, holes may be provided through the plate 52 at positions corresponding axially with the positions of the lugs 50 as is generally indicated at 54. The sensor 26 may include a suitable photoelectric cell positioned on one side of the plate 52 and a light source may be positioned in axial alignment therewith on the other side of the plate. As the shaft 20 carrying the plate 52 and the coacting portion of the coupling 18 rotates, pulses are generated by the sensor 26 each time one of the holes 54 permits light from the light source 56 to strike the sensor. Thus, the size of the holes provided through the plate 52 determines the relative time duration of the pulses with respect to the time between pulses.

In the illustrated example, four pulses are generated for each complete revolution of a shaft 20. The total number of pulses generated over some predetermined period of time is indicative of the speed of the coupling portion and the existence of a pulse in conjunction with the positioning of the sensor provides an indication of the angular position of the lugs 50. The sensors 26 and 28 may therefore be disposed in a known relationship relative to each other so that the coincidence of a pulse from the sensor 26 with a pulse from the sensor 28 indicates the proper alignment for engagement of the interlocking surfaces on the coacting portions of the coupling 18.

It should be understood that the sensor arrangement illustrated in FIG. 2 is exemplary of one arrangement which may be utilized to provide signals having characteristics related to the speed and angular position of the coacting portions of the coupling 18. Other types of sensing arrangements such as magnetic sensors or suitable encoders may also be utilized.

The sensors should be designated such that the number of pulses per revolution is sufficient to permit a speed match between the coacting portions within a desired accuracy range. Moreover, the pulse width or duty cycle of each pulse of the generated signal should be such that the angular alignment can be matched to a given accuracy. For example, if a given sensing arrangement produces N pulses per revolution, then in a given sample time T, the speed difference S between the shafts may be determined in terms of pulses as follows:

$$S = (S_a - S_b) \text{ revolutions/min.}$$

$$(S_a - S_b) \text{ RPM} \left(\frac{1 \text{ min}}{60 \text{ sec}}\right) (T \text{ sec}) = \frac{T(S_a - S_b)}{60} \text{ revolutions}$$

$$Q = \frac{T(S_a - S_b)}{60} \text{ revolutions} \left(\frac{N \text{ pulses}}{\text{revol.}}\right) = \frac{NT(S_a - S_b)}{60} \text{ pulses}$$

where S is speed difference in revolutions per minute and Q is the number of pulses generated by the speed difference over the sample time T.

Since the minimum detectable count in a digital system is 1, the above equation for Q determines the relationship for S, N and T. Thus, this equation can be used to determine parameters for a given situation. For example, if a minimum determinable speed difference of one RPM were acceptable and if a sample time T of .1 seconds were desired, the above equation may be utilized to determine the minimum required number of pulses per revolution as follows:

$$Q = \frac{NT(S_a - S_b)}{60} = 1 \text{ pulse}$$

$$N = \frac{60}{T(S_a - S_b)} = \frac{60}{.1(1)} = 600 \text{ pulses/revolution}$$

If the sample time were increased to 1 second then N would drop to 60 pulses per revolution. Similarly, varying the acceptable speed difference would also affect the value for N.

For a given coupling device which engages to lock two shafts together, there will be some minimal angular difference which will be acceptable. If this difference is expressed as A°, then the following relationship expresses A as a function of the pulses per revolution N and the duty cycle D of the pulses from the sensor:

$$A \frac{\text{degrees}}{\text{pulse}} = (360°/\text{revolution}) \left(\frac{1 \text{ rev.}}{N \text{ pulses}}\right) \left(\frac{D \text{ duty cycle}}{100}\right) = \frac{360 \, D}{100 \, N} \frac{\text{degrees}}{\text{pulse}}$$

Since the coincidence of two pulses from the two shaft positions and speed sensors (one associated with shaft 20 and one associated with shaft 22) can be used to signal that the shafts are within A degrees of each other, the duty cycle for a given difference angle A and pulses per revolution N can be determined.

For example, if N = 60 pulses/revolution and A = 1° then $$D = \frac{100 \, AN}{360} = \frac{100 \, (1)(60)}{360} = \frac{100}{60} = 16.7\%$$

Thus, the pulses would be on 16.7% of the time and off 83.3% of the time as the shaft rotates. It can therefore be seen from the above that tthe complete specification of the two shaft encoders can be derived to fit the requirements of the coupling control system based on minimum acceptable shaft speed difference and angular displacement as well as desired sample time, i.e., the desired counting period of the counters 30 and 34.

Figure 3:
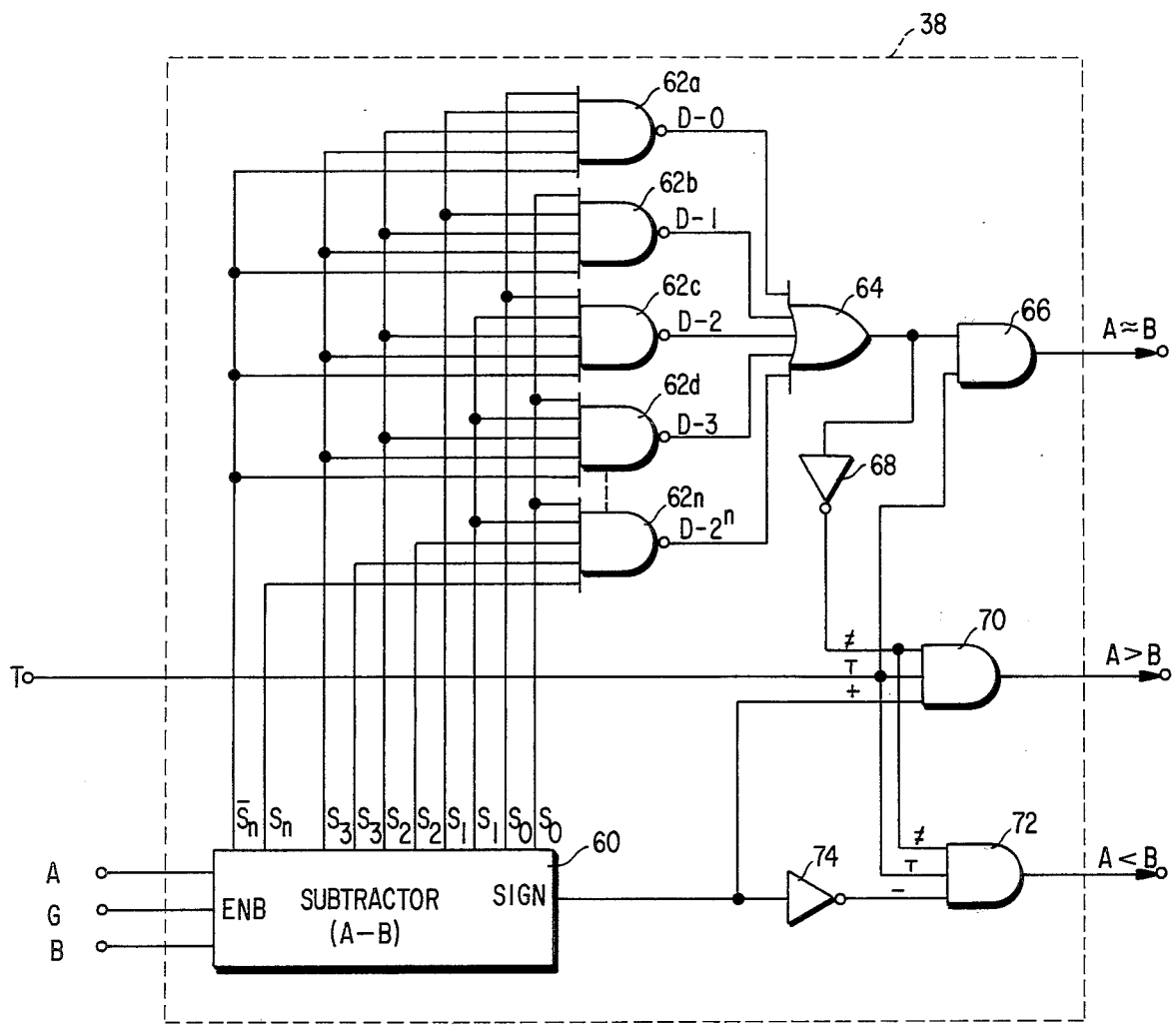
FIG. 3 is a functional block diagram illustrating in greater detail one embodiment of the subtractor and decoder circuit of FIG. 1; and, FIGS. 4A–4J are graphical representations of the signals appearing at various points in the circuit of FIG. 1 illustrating the timing therebetween.

The subtractor and decoder circuit 38 may be any suitable conventional binary subtractor having its difference output signal decoded by suitable logic gates to provide the desired three output signals. For example, as illustrated in FIG. 3, the subtractor and decoder circuit 38 may include a suitable conventional binary or BCD subtractor 60 connected to receive the A and B signals in parallel from the respective counters 30 and 34 and to provide both the binary bits $S_0$–$S_n$ of the difference signal and the sign of the difference signal.

The subtractor 60 may be enabled by the G signal from the time base generator 36 of FIG. 1 at the end of a counting cycle. The binary difference signal from the subtractor 60 may then be decoded to provide an indication of the magnitude of the difference and the direction in which speed must be changed to bring the speed difference to within the desired range.

Decoding may be accomplished by a suitable logic circuit comprising a plurality of NAND gates 62a–62n where (n−1) is the maximum acceptable difference between the counts in the counters 30 and 34. The NAND gate 62a may be connected to the subtractor 60 to provide an output signal when the difference is zero. Accordingly, the false or binary ZERO output signals $\bar{S}_0$–$\bar{S}_n$ from the subtractor 60 may be supplied to the input terminals of the NAND gate 62a so that the output signal D–O from the NAND gate 62a assumes a high signal level for a zero difference condition.

The remaining NAND gates 62b–62n may be appropriately connected to the subtractor 60 as illustrated to decode other differences up to the maximum acceptable difference (n−1). For example, if the maximum acceptable difference is ±3 counts, then four NAND gates are required to decode the binary numbers 0, 1, 2 and 3. Depending upon the sampling time T and the number of pulses N per revolution, this maximum acceptable counter difference may, for example, correspond to a difference in shaft speed of one revolution per minute.

The output signals from the NAND gates 62a–62n may be applied to the respective input terminals of an OR gate 64. The output signal from the OR gate 64 may be applied to one input terminal of a two input terminal AND gate 66 and through an inverter 68 to one input terminal of a pair of three input terminal AND gates 70 and 72. The AND gate 66 supplies the A≈B signal to the multivibrator 46 of FIG. 1 and the AND gates 70 and 72 supply the respective A>B and A<B signals to the accelerate and decelerate circuits 40 and 44, respectively.

The signal representative of the sign of the difference signal may be supplied from the subtractor 60 to one input terminal of the AND gate 70 and through an inverter 74 to one input terminal of the AND gate 72. The timing signal T from the time base generator 36 of FIG. 1 may be supplied to one input terminal of each of the AND gates 66, 70 and 72.

In operation, the subtractor 60 is enabled at the end of a counting cycle and the B counter output signal is subtracted from the A counter output signal. If the counter difference and therefore the speed difference is within the predetermined acceptable range, one of the NAND gates 62a–62n provides an output signal through the OR gate 64, enabling the AND gate 66 and inhibiting the AND gates 70 and 72. The timing signal T is passed by the enabled AND gate 66 and the multivibrator 46 of FIG. 1 is triggered, enabling the coincidence AND gate 32 so that the hold circuit 48 may be set when pulses in each of the signals SA and SB coincide.

If the counter difference is outside the acceptable range, the output signal from the OR gate 64 inhibits the AND gate 66. The inverted output signal from the OR gate 64 provides one enabling signal to each of the AND gates 70 and 72 with another enabling signal being supplied to one of the AND gates 70 and 72 by the sign signal from the subtractor 60.

For example, if A is greater than B by an amount greater than the acceptable difference when the subtractor 60 is enabled, the sign of the difference is positive and the sign signal may assume a high or binary ONE signal level. An enabling signal is therefore provided to the AND gate 70 and an inhibiting signal is supplied to the AND gate 72. The T timing signal is thus passed to the accelerate circuit 40 of FIG. 1 as the A>B signal to increase the speed of the auxiliary propulsion system.

Similarly, if A is less than B by an amount exceeding the acceptable difference when the subtractor is enabled, the sign of the difference is negative and the sign signal may assume a low or binary ZERO signal level. An enabling signal is thus provided to the AND gate 72 and an inhibiting signal is provided to the AND gate 70. The timing signal T is therefore passed to the decelerate circuit 44 of FIG. 1 as the A<B signal to decrease the speed of the auxiliary propulsion system.

Since single pulses are supplied from the illustrated subtractor and decoder circuit 38 of FIG. 3 to the accelerate and decelerate circuits 40 and 44 to control motor speed, thus circuits and the motor speed control 42 may be any suitable conventional circuit designed to increase or decrease the speed of the auxiliary propulsion system by some predetermined incremental amount in response to the individual speed control pulses. For example, the motor speed control 42 of FIG. 1 may be a variable transformer or other voltage control device driven by pulse responsive stepping motors. The accelerate and decelerate circuits 40 and 44 may amplify or otherwise shape the pulses from the subtractor and decoder circuit 38 as necessary to thereby provide pulses of the proper level and duration to the stepping motors.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for controlling the connection of a drive member of a rotating auxiliary propulsion system to a drive shaft rotating independently of the auxiliary propulsion system comprising:

first clutch means connected for rotation with the drive member;
second clutch means connected for rotation with the drive shaft and disposed for selective engagement with said first clutch means;
means for generating a first electrical signal having electrical characteristics related to the speed and angular position of the first clutch means;
means for generating a second electrical signal having electrical characteristics related to the speed and angular position of the second clutch means;
first circuit means responsive to the speed related characteristics of said first and second electrical signals for sensing a differential speed relationship between the first and second clutch means and for generating an enable signal in response to a sensed differential speed relationship within a predetermined speed difference range;
second circuit means responsive to the angular position related characteristics of said first and second electrical signals and to said enable signal for effecting the selective engagement of said first and second clutch means to thereby effect the connection of the drive member to the drive shaft with a desired speed difference and angular position relationship between the first and second clutch means; and
third circuit means for varying the speed of the auxiliary propulsion system drive member in a direction tending to reduce the speed difference between the first and second clutch means to within said predetermined speed difference range in response to a sensed differential speed relationship outside said predetermined speed difference range.

2. The apparatus of claim 1 wherein said first signal generating means comprises means disposed on the auxiliary propulsion system drive member for rotation therewith, and means cooperable with said means on the drive member for generating a series of pulses in response to rotation of the drive member, the series of pulses having a frequency related to the rotational speed of the drive member and each pulse of the series of pulses being indicative of the angular position of an interlocking means on said first clutch means, and wherein said second signal generating means comprises means disposed on the drive shaft for rotation therewith, and means cooperable with said means on the drive shaft for generating a series of pulses in response to rotation of the drive shaft, the series of pulses having a frequency related to the rotational speed of the drive shaft and each pulse of the series of pulses being indicative of the angular position of an interlocking means on said second clutch means.

3. The apparatus of claim 1 wherein each of said first and second electrical signals is a series of pulses related in frequency to rotational speeds of the respective first and second clutch means and wherein said first circuit means comprises first and second counting means for counting the number of pulses in said first and second electrical signals, respectively, over the same time period, and means for calculating the amount and sign of the difference between the counts of said counting means at the end of said time period.

4. The apparatus of claim 3 wherein said first circuit means further includes means for decoding the calculated difference between the counts of said counting means and for providing said enable signal in response to an amount of said difference at or below a predetermined value, said decoding means further including means for providing an accelerate signal in response to an amount of said difference above said predetermined value and one sign of said difference, and means for providing a decelerate signal in response to an amount of said difference above said predetermined value and another sign of said difference.

5. The apparatus of claim 4 wherein said third circuit means comprises means for increasing and decreasing the speed of the auxiliary propulsion system in response to said accelerate and decelerate signals, respectively.

6. The apparatus of claim 2 wherein said first circuit means comprises first and second counting means for counting the number of pulses in said first and second electrical signals, respectively, over the same time period, and means for calculating the amount and sign of the difference between the counts of said counting means at the end of said time period, said first circuit means further including means for decoding the calculated difference between the counts of said counting means and for providing said enable signal in response to an amount of said difference at or below a predetermined value, said decoding means further including means for providing an accelerate signal in response to an amount of said difference above said predetermined value and one sign of said difference, and means for providing a decelerate signal in response to an amount of said difference above said predetermined value and another sign of said difference.

7. The apparatus of claim 6 wherein said third circuit means comprises means for increasing and decreasing the speed of the auxiliary propulsion system in response to said accelerate and decelerate signals, respectively.

8. Apparatus for connecting driving members of two rotating power sources for simultaneous operation comprising:
   a first coupling means connected for rotation with one of the power sources at a speed related to the rotational speed thereof;
   a second coupling means connected for rotation with the other of the power sources at a speed related to the rotational speed thereof and in selectively engageable relation to said first coupling means;
   first circuit means for generating first and second pulse signals each indicative of the speed and angular position relationships of said first and second coupling means;
   second circuit means responsive to said first and second pulse signals for generating a control signal representative of the speed relationship between said first and second coupling means; and
   third circuit means responsive to said control signal and said first and second pulse signals for moving said first and second coupling means into engaging relation upon simultaneous occurrence of desired speed and angular position relationships between said coupling means and for generating a speed control signal to vary the speed of one of the power sources in a direction tending to effect said desired speed relationship between said coupling means in response to other than said desired speed relationship between said coupling means.

9. The apparatus of claim 8 wherein each of said first and second pulse signals is a series of pulses related in frequency to rotational speeds of the respective first and second coupling means and wherein said second circuit means comprises first and second counting means for counting the number of pulses in said first and second pulse signals, respectively, over the same time period, and means for calculating the amount and sign of the difference between the counts of said counting means at the end of said time period.

10. The apparatus of claim 9 wherein said second circuit means further includes means for decoding the calculated difference between the counts of said counting means and for providing one signal level of said control signal in response to an amount of said difference at or below a predetermined value and another signal level of said control signal in response to an amount of said difference above said predetermined value.

11. The apparatus of claim 10 wherein said speed control signal includes an accelerate signal and a decelerate signal, said third circuit means comprising:
   means for generating said accelerate signal in response to said one signal level of said control signal and one sign of said difference;
   means for generating said decelerate signal in response to said another signal level of said control signal and another sign of said difference; and
   means for increasing and decreasing the speed of said one of the power sources in response to said accelerate and decelerate signals, respectively.

12. The apparatus of claim 8 wherein said first circuit means comprises:
   means disposed on the driving member of one of said power sources for rotation therewith;
   means cooperable with said means of the driving member of said one power source for generating a series of pulses in response to rotation of the driving member, the series of pulses having a frequency related to the rotational speed of the driving member and each pulse of the series of pulses being indicative of the angular position of an interlocking means on said first coupling means;
   means disposed on the driving member of the other of said power sources for rotation therewith; and
   means cooperable with said means on the driving member of said other power source for generating a series of pulses in response to rotation of the driving member, the series of pulses having a frequency related to the rotational speed of the driving member and each pulse of the series of pulses being indicative of the angular position of an interlocking means on sid second coupling means.

13. A method for controlling the connection of a drive member of a rotating auxiliary propulsion system to a drive shaft rotating independently of the auxiliary propulsion system through coacting portions of clutch means connected for rotation with the drive member and the drive shaft, the method comprising the steps of:
   generating a first electrical signal having electrical characteristics related to the speed and angular position of the coacting portion of the clutch means associated with the drive member;
   generating a second electrical signal having electrical characteristics related to the speed and angular position of the coacting portion of the clutch means associated with the drive shaft;
   sensing a differential speed relationship between the coacting portions of the clutch means responsively to the speed related characteristics of said first and second electrical signals;
   generating an enable signal in response to a sensed differential speed relationship within a predetermined speed difference range;
   effecting the selective engagement of the coacting portions of the clutch means responsively to the angular position related characteristics of said first and second electrical signals and to said enable signal to thereby effect the connection of the drive member to the drive shaft with a desired speed difference and angular position relationship between the coacting portions of the clutch means; and
   varying the speed of the auxiliary propulsion system drive member in a direction tending to reduce the speed difference between the coacting portions of the clutch means to within said predetermined speed difference range in response to a sensed differential speed relationship outside said predetermined speed difference range.

14. The method of claim 13 wherein each of said first and second electrical signals comprises a series of pulses related in frequency to the speed of the coacting portion of the clutch means associated therewith, the method further including the steps of:

counting the number of pulses in said first and second electrical signals, respectively, over the same time period;

calculating the amount and sign of the difference between the counted pulses at the end of said time period;

decoding the calculated difference between the counted pulses to provide said enable signal in response to an amount of the difference at or below a predetermined value to provide an accelerate signal in response to an amount of said difference above said predetermined value and one sign of said difference and to provide a decelerate signal in response to an amount of said difference above said predetermined value and another sign of said difference.

15. The method of claim 14 including the step of:

increasing and decreasing the speed of the auxiliary propulsion system in response to said accelerate and decelerate signals, respectively.

* * * * *